US011712861B2

United States Patent
Marchini et al.

(10) Patent No.: US 11,712,861 B2
(45) Date of Patent: Aug. 1, 2023

(54) METHOD FOR VERIFYING THE CORRECT FORMATION OF THE BEADS IN A PROCESS AND A PLANT FOR BUILDING TYRES FOR VEHICLE WHEELS

(71) Applicant: PIRELLI TYRE S.P.A., Milan (IT)

(72) Inventors: Maurizio Marchini, Milan (IT); Stefano Balia, Milan (IT); Stefano Boracco, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 586 days.

(21) Appl. No.: 16/299,710

(22) Filed: Mar. 12, 2019

(65) Prior Publication Data

US 2019/0210310 A1    Jul. 11, 2019

Related U.S. Application Data

(63) Continuation of application No. 14/651,954, filed as application No. PCT/IB2013/060979 on Dec. 16, 2013, now abandoned.

(Continued)

(30) Foreign Application Priority Data

Dec. 19, 2012    (IT) .......................... MI2012A002179

(51) Int. Cl.
*B29D 30/48*    (2006.01)
*B29D 30/00*    (2006.01)
(Continued)

(52) U.S. Cl.
CPC ........... *B29D 30/00* (2013.01); *B29D 30/005* (2013.01); *B29D 30/0016* (2013.01);
(Continued)

(58) Field of Classification Search
CPC ........ B29D 30/18; B29D 30/32; B29D 30/48; B29D 30/0016; B29D 2030/0044; B29D 2030/3207
See application file for complete search history.

(56) References Cited

U.S. PATENT DOCUMENTS

| 1,964,363 A | 6/1934 | Ostling et al. |
| 2,790,481 A | 4/1957 | Beckadolph et al. |

(Continued)

FOREIGN PATENT DOCUMENTS

| CN | 101870175 A | 10/2010 |
| CN | 102300700 A | 12/2011 |

(Continued)

OTHER PUBLICATIONS

International Search Report from the European Patent Office for International Application No. PCT/IB2013/060979 dated Apr. 7, 2014.

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A method for verifying the correct formation of the beads in a process and a plant for building tyres for vehicle wheels, includes: loading a plurality of annular anchoring structures in a storage, disposing them in two groups separated by an opening; positioning a building drum provided with a carcass sleeve in a tyre bead-forming machine; picking up two of the annular anchoring structures from the storage and loading them on the tyre bead-forming machine. In a work area of the tyre bead-forming machine, on each of two axially opposite zones of the carcass sleeve, a respective annular anchoring structure is fit and each of the abovementioned zones is turned up around the respective annular anchoring structure to form the beads. The aforesaid opening (Continued)

allows an operator to conduct a visual inspection of the work area and/or access the work area during the entire work cycle of the machine.

48 Claims, 6 Drawing Sheets

Related U.S. Application Data

(60) Provisional application No. 61/764,331, filed on Feb. 13, 2013.

(51) Int. Cl.
*B29D 30/08* (2006.01)
*B29D 30/32* (2006.01)

(52) U.S. Cl.
CPC .............. *B29D 30/08* (2013.01); *B29D 30/32* (2013.01); *B29D 2030/0022* (2013.01); *B29D 2030/0038* (2013.01); *B29D 2030/0044* (2013.01); *B29D 2030/0066* (2013.01); *B29D 2030/3207* (2013.01); *B29D 2030/487* (2013.01)

(56) References Cited

U.S. PATENT DOCUMENTS

| | | | |
|---|---|---|---|
| 3,700,526 A * | 10/1972 | Brey et al. ............. | B29D 30/26 156/396 |
| 3,881,526 A | 5/1975 | Bell et al. | |
| 4,028,059 A | 6/1977 | LaBelle, Jr. | |
| 4,726,861 A | 2/1988 | Vorih et al. | |
| 4,833,770 A | 5/1989 | Esser et al. | |
| 4,890,969 A | 1/1990 | Esser | |
| 5,093,059 A | 3/1992 | Nathoo et al. | |
| 5,915,527 A | 6/1999 | Nakamura | |
| 6,182,731 B1 | 2/2001 | Urayama | |
| 6,468,016 B1 | 10/2002 | Roman | |
| 7,134,860 B2 | 11/2006 | Pierik et al. | |
| 2003/0042340 A1 | 3/2003 | Clifford et al. | |
| 2006/0130751 A1 | 6/2006 | Volfovski et al. | |
| 2007/0272345 A1 | 11/2007 | Sawadal | |
| 2008/0023124 A1 | 1/2008 | Lacagnina et al. | |
| 2008/0150467 A1 | 6/2008 | Hashimoto et al. | |
| 2009/0277558 A1 | 11/2009 | Kikuchi et al. | |
| 2010/0017027 A1 | 1/2010 | Truttmann | |
| 2010/0024959 A1 | 2/2010 | Mancini et al. | |
| 2010/0043947 A1 | 2/2010 | Janszen et al. | |
| 2010/0307662 A1 | 12/2010 | Mancini et al. | |
| 2011/0108187 A1 | 5/2011 | Gianni et al. | |
| 2011/0290403 A1 | 12/2011 | D'ambrosio et al. | |
| 2013/0294881 A1 | 11/2013 | Janszen et al. | |

FOREIGN PATENT DOCUMENTS

| | | | |
|---|---|---|---|
| CN | 103298604 A | | 9/2013 |
| DE | 1180515 | | 10/1964 |
| DE | 4028059 A1 | | 3/1992 |
| DE | 102006051540 | | 8/2008 |
| DE | 102009042239 A1 | | 4/2010 |
| EP | 2 258 541 A1 | | 12/2010 |
| ER | 2 934 871 A1 | | 10/2015 |
| JP | 2000-353735 | | 12/2000 |
| JP | 2005-162364 A | * | 6/2005 |
| JP | 2006-297778 | | 11/2006 |
| RU | 2 291 780 C2 | | 1/2005 |
| WO | WO 01/32409 | | 5/2001 |
| WO | WO-01/36185 A1 | * | 5/2001 |
| WO | WO 02/094545 A1 | | 11/2002 |
| WO | WO 02/096630 | | 12/2002 |
| WO | WO 2008/099236 A1 | | 8/2008 |
| WO | WO 2012/063153 A1 | | 5/2012 |
| WO | WO 2014/097111 | | 6/2014 |

OTHER PUBLICATIONS

Written Opinion of the International Searching Authority from the European Patent Office for International Application No. PCT/IB2013/060979 dated Apr. 7, 2014.
Office Action in Chinese Counterpart Patent Application No. 20130070060.4, dated Aug. 1, 2016.
Decision on Grant Patent for Invention for Russian Patent Application No. 2015128274/05(043853), dated Oct. 18, 2017. (17 pages + 7 pages translation).
Search Report and Office Action dated Dec. 2, 2019, the Federal Public Service Ministry of Economy National Institute of Industrial Property in counterpart Brazilian Application No. BR112015013677.
Office Action dated Jul. 12, 2019, by the Divisional Office of Patents Mexican Patent Office in counterpart Mexican Application No. MX/a/2015/007489.

* cited by examiner

METHOD FOR VERIFYING THE CORRECT FORMATION OF THE BEADS IN A PROCESS AND A PLANT FOR BUILDING TYRES FOR VEHICLE WHEELS

CROSS REFERENCE TO RELATED APPLICATIONS

This application is a continuation of U.S. application Ser. No. 14/651,954, filed Jun. 12, 2015, which is a national phase application based on PCT/IB2013/060979, filed Dec. 16, 2013, which claims the priority of Italian Patent Application No. MI2012A002179, filed Dec. 19, 2012, and the benefit of U.S. Provisional Application No. 61/764,331, filed Feb. 13, 2013, the content of each application being incorporated herein by reference.

BACKGROUND OF THE INVENTION

Field of the Invention

The present invention has as object a method for verifying the correct formation of the beads in a process and a plant for building tyres for vehicle wheels.

Description of the Related Art

A tyre for vehicle wheels generally comprises a carcass structure comprising at least one carcass ply having respectively opposite terminal zones engaged with respective annular anchoring structures, integrated in the areas usually identified with the name of "beads", having an internal diameter substantially corresponding to a so-called "fitting diameter" of the tyre on a respective rim.

In the present description and in the subsequent claims, by "annular anchoring structure" it is intended an element of the tyre that comprises a bead core. Preferably such component comprises a bead core and a filler insert. Still more preferably, such component comprises a bead core and a filler insert, both enclosed by one edge.

The document WO 2012/063153, on behalf of the same Applicant, describes a plant for building tyres for vehicle wheels which comprises a line for building carcass structures, in which a carcass structure is formed on a building drum. The plant further comprises a line for building crown structures, in which a crown structure is formed on a forming drum. A building station is dedicated to obtaining the belt structure and a work station is arranged for obtaining the tread band and/or the sidewalls. The plant is also provided with an assembly and shaping station operatively associated with the line for building carcass structures and with the line for building crown structures, in which the carcass structure is shaped toroidally and associated with the crown structure, in a manner so as to obtain a green tyre. The green tyres built by the plant are sequentially transferred to a curing line, from which the moulded and cured tyres are obtained. At the line for building carcass structures, a station is placed that is dedicated to the integration of the annular anchoring structures in the carcass ply. Such station comprises a tyre bead-forming machine, a first storage area and a second storage area for annular anchoring structures. A first conveyor device is moveable between a position for picking up pairs of annular anchoring structures from the first storage area and a release position for releasing such pairs of annular anchoring structures in the tyre bead-forming machine. A second conveyor device moves a plurality of baskets housing the annular anchoring structures between the first storage area and the second storage area and vice versa. The building drums, each provided with a partial carcass sleeve, are carried in succession outside the line for building carcass structures up to the station dedicated for the integration of the annular anchoring structures, for receiving said annular anchoring structures, and then brought back into the line for building carcass structures.

SUMMARY OF THE INVENTION

The Applicant has found that in the tyre production plants with high flexibility and productivity, such as that described in WO 2012/063153, the bulk of the apparatuses constituting the plant is considerable and requires the availability of industrial spaces that are correspondingly wide and costly. Such costs affect the production cost of the single tyre.

The Applicant has in particular perceived that the devices and the apparatuses of the above-described plants with high flexibility occupy much space, also because they must be positioned in a manner so as to allow the operators to access the single devices/apparatuses, in order to inspect them and/or repair them and/or, more generally, maintain them.

In particular, the Applicant has observed that, still in the scope of plants with high flexibility, a critical factor can be found in the station dedicated to the integration of the annular anchoring structures, since this must ensure the storage and the correct simultaneous management of a large number of types of annular anchoring structures intended for tyres with different fitting diameters and, at the same time, the facilitated access of operators to the tyre bead-forming machine and to the storage.

The storage with considerable size, the presence of moving systems that ensure the flexibility of the management of the annular anchoring structures and the need for access spaces for the operators are all aspects that contribute to increasing the bulk of the station dedicated for the integration of the annular anchoring structures; indeed, it is known, according to that illustrated in WO 2012/063153, to position such station outside the line for building carcass structures.

In such context, the Applicant has perceived the need to reduce the bulk of the plants for producing tyres with high flexibility, while at the same time maintaining:
  the flexibility of the plants itself, in a manner so as to be able to quickly change the type of tyre produced from one batch to the next;
  the high productivity of the same; and
  the possibility for operators to easily conduct control and maintenance operations.

More particularly, the Applicant has perceived the importance of limiting the bulk of the station dedicated for the integration of the annular anchoring structures in the carcass ply while at the same time maintaining:
  the simultaneous maintenance of a large number of types of annular anchoring structures intended for tyres with different fitting diameters;
  the possibility for operators to easily conduct control and maintenance operations on the tyre bead-forming machine.

The Applicant has finally found that, by obtaining a storage for the annular anchoring structures provided with at least one opening with size suitable for the passage of an operator and providing for a loading area for the storage on one side thereof and the positioning of a tyre bead-forming machine on the opposite side, it is possible to structure the station dedicated for the integration of the annular anchoring structures in the carcass sleeves and pair it with the carcass building line with a considerable savings of space, while ensuring the accessibility to the machine itself, and more generally substantially to all the devices of said station dedicated for the integration of said annular anchoring structures. More specifically, according to a first aspect, the present invention relates to a method for verifying the correct formation of the beads in a process and a plant for building tyres for vehicle wheels.

Preferably, the method comprises loading a plurality of annular anchoring structures in a storage, disposing them in at least two groups separated by at least one opening.

Preferably, a building drum provided with a carcass sleeve is positioned in a tyre bead-forming machine.

Preferably, two of said annular anchoring structures are picked up from the storage and loaded on the tyre bead-forming machine.

Preferably, in a work area of the tyre bead-forming machine, on each of two axially opposite zones of the carcass sleeve, a respective annular anchoring structure is fit and each of said zones is turned up around the respective annular anchoring structure to form the beads.

Preferably, said at least one opening allows the visual inspection of the work area and access to said work area.

According to a different aspect, the present invention relates to a plant for building tyres for vehicle wheels.

Preferably, the plant comprises a line for building carcass structures on a building drum comprising a plurality of building stations and devices for transferring the building drum from one building station to another. Preferably, the plant comprises a line for building crown structures on a forming drum comprising a plurality of work stations and devices for transferring the forming drum from one work station to another.

Preferably, one of the building stations is a station for the integration of annular anchoring structures in the carcass sleeve and comprises a storage for the annular anchoring structures having a first free side for loading the annular anchoring structures in the storage and a second side opposite the first side.

Preferably, the station for the integration comprises a tyre bead-forming machine arranged adjacent to the second side of the storage.

Preferably, the storage has at least one opening adapted to place the first side in communication with the tyre bead-forming machine, for the visual inspection of the tyre bead-forming machine and for access to said tyre bead-forming machine.

According to a different aspect, the present invention relates to an apparatus for controlling the management of annular anchoring structures in a process and a plant for building tyres for vehicle wheels.

Preferably, the apparatus comprises a storage for the annular anchoring structures having a first free side for loading the annular anchoring structures in the storage and a second side, opposite the first side, arranged adjacent to a tyre bead-forming machine.

Preferably, the apparatus comprises a handling device arranged between the second side and the tyre bead-forming machine and moveable between a position for picking up the annular anchoring structures from the storage and a position for releasing the annular anchoring structures in the tyre bead-forming machine.

Preferably, the storage has at least one opening adapted to place the first side in communication with the second side and with the tyre bead-forming machine, for the visual inspection of the tyre bead-forming machine and for access to said tyre bead-forming machine.

The Applicant deems that the present invention allows arranging the different elements of the plant (machines, devices, etc.) according to a more rational and compact lay-out, without the plant losing flexibility and productivity and ensuring the quality of the produced tyres.

In particular, the Applicant deems that the presence of the opening in the storage allows bringing the second side thereof—that from which the annular anchoring structures are picked up-close to the tyre bead-forming machine and the latter to the rest of the line for building the carcass structures, still allowing the operator to visually inspect the technological bead formation cycle and possibly easily access the tyre bead-forming machine if necessary, essential operations for ensuring the quality of the bead formation cycle and hence of the tyres produced. Such access is ensured without having to stop the production for moving parts of the plant. In addition, the first side of the storage is always free to allow the operator to resupply the storage itself with the annular anchoring structures, preferably by manual loading. The lay-out obtained therefore allows complete accessibility to the areas where the presence of the operator is essential, i.e. the load area for the annular anchoring structures in the storage and the quality monitoring area for the bead formation cycle (such cycle carried out in the tyre bead-forming machine).

The present invention, in at least one of the aforesaid aspects, can also have one or more of the preferred characteristics which are described hereinbelow.

Preferably, the visual inspection of the work area and/or the access to said work area are carried out during the formation of the beads.

Preferably, the visual inspection of the work area and/or the access to said work area are carried out during the picking up of the two annular anchoring structures from the storage.

Preferably, the visual inspection of the work area and/or the access to said work area are carried out when loading the two annular anchoring structures on the tyre bead-forming machine.

Preferably, the visual inspection of the work area and/or the access to said work area are carried out during the positioning of the drum in the tyre bead-forming machine.

Preferably, the visual inspection of the work area and/or the access to said work area are carried out when extracting the building drum with the carcass sleeve provided with the beads formed by the tyre bead-forming machine.

The abovementioned accessibility to the areas where the presence of the operator is essential is ensured during the operation of the plant, in particular during any operation of the station for the integration of annular anchoring structures.

Preferably, the station for the integration of annular anchoring structures comprises a handling device arranged between the second side and the tyre bead-forming machine and moveable between a position for picking up the annular anchoring structures from the storage and a position for releasing the annular anchoring structures to the tyre bead-forming machine.

Preferably, the handling device is sized to carry a maximum load of about 12 Kg. The handling device must pick up and carry only one or preferably two annular anchoring structures at a time, whose weight is usually comprised between about 0.2 Kg and about 0.7 Kg. The handling device is specifically sized to carry such weights and position them with precision. Preferably, the station for the integration of annular anchoring structures comprises a conveyor device operatively active between the tyre bead-forming machine, a building station downstream of said tyre bead-forming machine and a building station upstream of said tyre bead-forming machine, for conveying the building drums between the building station upstream and the tyre bead-forming machine and between the tyre bead-forming machine and the building station downstream. The station for the integration of annular anchoring structures is disposed in the succession of building stations which form the carcass building line, occupying an extremely limited space.

In one embodiment, the conveyor device is arranged adjacent to the tyre bead-forming machine and on the opposite side with respect to the storage. Preferably, the conveyor device is an anthropomorphic arm having a base rested adjacent to the tyre bead-forming machine and on the opposite side with respect to the storage. The conveyor device is close to the tyre bead-forming machine but, being situated on the side opposite the abovementioned opening, it does not block the access of the operator. Preferably, the conveyor device is sized to carry a maximum load of about 350 Kg. The conveyor device must pick up and carry one building drum at a time, whose weight is usually comprised between about 180 Kg and about 220 Kg. The conveyor device is sized specifically to carry such weight and to position the drum with precision.

In a preferred embodiment, the tyre bead-forming machine comprises: tyre bead-forming devices arranged in a lower area of said tyre bead-forming machine; receiving devices for receiving the annular anchoring structures arranged in an upper area of said tyre bead-forming machine; devices for conveying the annular anchoring structures from the upper area to the lower area.

Preferably, the upper area is arranged at a height equivalent or greater than a height of the opening.

Preferably, in the release position the handling device transfers the annular anchoring structures to the receiving devices arranged in the upper area.

The receiving devices positioned above the tyre bead-forming devices allow the delivery of the annular anchoring structures from the handling device to the tyre bead-forming machine without the area—comprised between the storage and the machine-being obstructed, such area being where the operator positions himself for inspecting the operation of the machine itself.

Preferably, the opening is faced on the tyre bead-forming machine. The access is therefore direct and immediate. In addition, the operator, physically positioned in the opening or in front of the same, can examine what occurs in the tyre bead-forming machine and/or intervene without interfering with moving parts and without being interposed between the annular anchoring structures still situated in the storage and other parts of the apparatus/plant.

In one embodiment, the storage comprises a plurality of seats, each capable of housing an annular anchoring structure, organised in at least two groups separated by said opening. The opening is situated between the groups of annular anchoring structures and the machine faces the opening in a manner such that the distance between said annular anchoring structures and said machine is not excessive, in order to make their conveying to the machine quick and simple.

Preferably, the handling device is moveable between said at least two groups along a path not interfering with said at least one opening. The handling device is moved around the abovementioned opening, preferably adjacent to and above the abovementioned opening. The access of the operator to the tyre bead-forming machine is possible in safe conditions, even while the handling device is moved in front of the second side of the storage for picking up or conveying the annular anchoring structures. Preferably, said at least two groups are spaced horizontally and the handling device is moveable above said opening. For the movement of the device, the vertical space is used, which is usually available in industrial plants, without having to occupy further ground.

Preferably, said opening has a width comprised between about 1500 mm and about 2500 mm. Preferably, said opening has a height comprised between about 2200 mm and about 2500 mm. Such dimensions allow the facilitated passage of the operator in erect position, even with possible tools.

In one embodiment, the storage comprises a plurality of baskets, each capable of housing a plurality of annular anchoring structures. The organisation in baskets makes it easier to manage the storage, above all when different annular anchoring structures are present. Each basket preferably contains about forty annular anchoring structures. The operator picks up said annular anchoring structures from a container, in which they are arranged horizontally on each other and divided by a separator; the operator loads them one at a time in the respective seats of the baskets.

Each basket can be completely or partially loaded.

Preferably, each basket has a single area for picking up the annular anchoring structures thereof. The handling device therefore has only one point of reference for each basket and must not pick up annular anchoring structures placed in different points. This makes the picking up operation quicker and more precise.

Preferably, said single area for picking up is arranged at a final end of the respective basket. The handling device therefore has sufficient space to be moved and grasp the annular anchoring structure without interfering with the other annular structures and/or other parts of the basket. Preferably, said single area for picking up is arranged at an upper portion of the final end. This allows the handling device to be moved closer to the annular anchoring structure, from above, without risks of interference. Preferably, the final end of each basket is faced on the second side of the storage. The handling device, being moved in front of the second side of the storage, is capable of reaching all the annular anchoring structures ready to be picked up.

Preferably, said single area for picking up is unvarying upon the variation of the characteristics of the annular anchoring structures. Even with different annular structures (different with regard to size and structure), the picking up operation is quick and precise because the handling device always has the same point of reference for each basket.

Preferably, each basket comprises devices for moving the annular anchoring structures towards said single area for picking up. The annular structures stored in a basket are carried in succession, one at a time, into the picking up area. The handling device, being moved in front of the second side of the storage, is capable of reaching all the annular anchoring structures of the storage itself.

Preferably, each basket has a main axis and houses the annular anchoring structures mutually arranged adjacent and coaxial to said main axis; the baskets of each group being adjacent to each other with the main axes thereof parallel. The baskets are arranged in groups (defining the same number of groups of seats) and arranged on one or more rows. Preferably, each basket is extractable on the first side in a position for loading the annular anchoring structures. Each basket can be extracted, preferably manually, from the group towards the side of the storage opposite that facing the machine for the formation of the beads. In such area, which is free, the operator can thus easily proceed with the loading of the basket itself, before then reinserting it in the group.

In one embodiment, the storage comprises two groups of baskets separated by said opening and each of the two groups comprises at least one pair of baskets formed by a lower basket and by an upper basket. Preferably, each of the two groups comprises a plurality of pairs thus defined.

Preferably, the lower basket projects on the second side with respect to the upper basket. In this manner, the handling device that descends from above can reach both the final end (single picking up area) of the upper basket and that of the lower basket without interferences.

Preferably, the lower basket is rested on a lower portion of a framework of said apparatus and, preferably, the upper basket is hung at an upper portion of a framework of said apparatus. In this manner, given that there is no support between the lower basket and the upper basket, the height of the position of the upper basket is limited, facilitating the operator loading.

Preferably, the storage comprises a guide disposed above the baskets, the handling device being moveable on said guide. The handling device can be moved for the entire width of the storage on the abovementioned guide and can descend to pick up the annular anchoring structures from the terminal ends of the baskets.

Preferably, the guide is disposed above said opening. The handling device is of overhead type and is mounted on a kind of portal that delimits the abovementioned opening.

Preferably the handling device comprises a gripper which can be moved along three axes. The gripper is in such a manner capable of being moved in front of the second side of the storage and of bringing the annular anchoring structures up to the tyre bead-forming machine.

Further characteristics and advantages will be clearer from the detailed description of a preferred but not exclusive embodiment of an apparatus for controlling the management of annular anchoring structures and of a plant for building tyres for vehicle wheels, in accordance with the present invention.

BRIEF DESCRIPTION OF THE DRAWINGS

Such description will be set forth hereinbelow with reference to the set of drawings, provided for merely exemplifying and hence non-limiting purposes, in which.

DETAILED DESCRIPTION OF THE INVENTION

With reference to the abovementioned figures, reference number 1 indicates overall a plant for building tyres 2 in accordance with the present invention.

Figure 6:
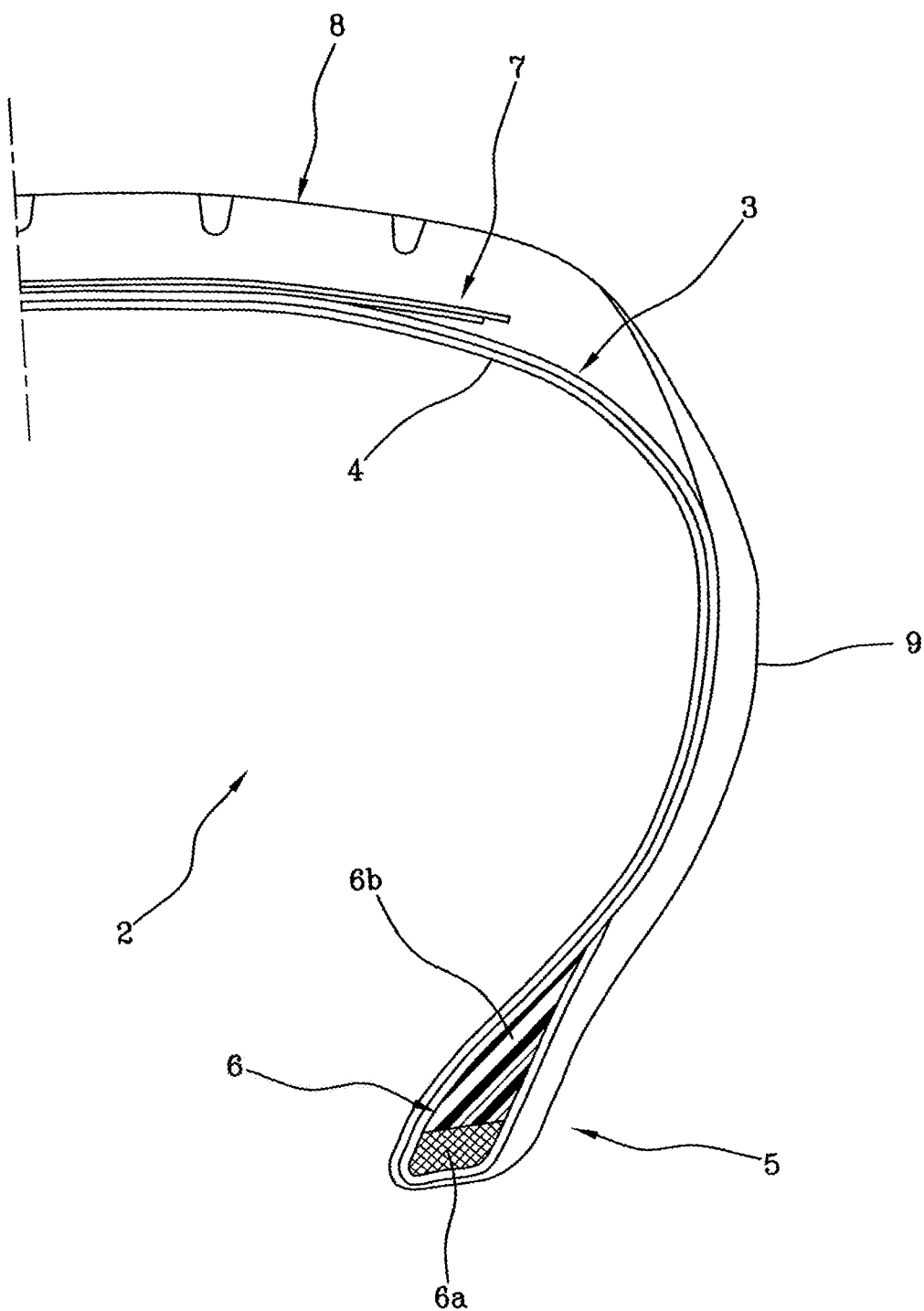
FIG. 6 schematically shows, in diameter section, a tyre for vehicle wheels obtained with the plant of FIG. 1.

The plant 1 is set to manufacture tyres 2 (FIG. 6) essentially comprising at least one carcass ply 3 preferably internally covered by a layer of impermeable elastic material or so-called liner 4, two so-called "beads" 5 integrating respective annular anchoring structures 6 comprising respective bead cores 6a possibly associated with elastomeric fillers 6b and engaged with the circumferential edges of the carcass ply 3, a belt structure 7 applied in radially external position relative to the carcass ply 3, a tread band 8 applied in radially external position relative to the belt structure 7, in a so-called crown area of the tyre 2, and two sidewalls 9 applied in laterally opposite positions on the carcass ply 3, each at a lateral area of the tyre 2, being extended from the corresponding bead 5 to the corresponding lateral edge of the tread band 8.

The plant 1 preferably comprises (FIG. 1) a line 10 for building carcass structures, in which a carcass structure, comprising at least one of the carcass plies 3 and the annular anchoring structures 6, is formed on a building drum 11. The line 10 for building carcass structures comprises a device 12 for building carcass sleeves on the building drums 11. The building device 12 comprises a plurality of stations 13. For example, a first station 13 obtains the liner 4, and in at least one second station 13 of the building device 12 the manufacturing of one or more carcass plies 3 can be actuated. The line 10 for building carcass structures further comprises a station 14 dedicated for the integration of the annular anchoring structures 6 in said at least one carcass ply 3, through the application of the same annular anchoring structures 6 in an axially external position relative to the zones of said at least one carcass ply 3 turned down in the direction of the rotation axis of said building drum 11, zones which are subsequently turned up around the annular anchoring structures 6. Downstream of the station 14 for the integration of the annular anchoring structures 6, further processing stations 13 can be present, for example for obtaining at least one portion of an anti-abrasive element or of the sidewalls 9. Devices, not illustrated, transfer the building drum from one building station to another.

Figure 1:
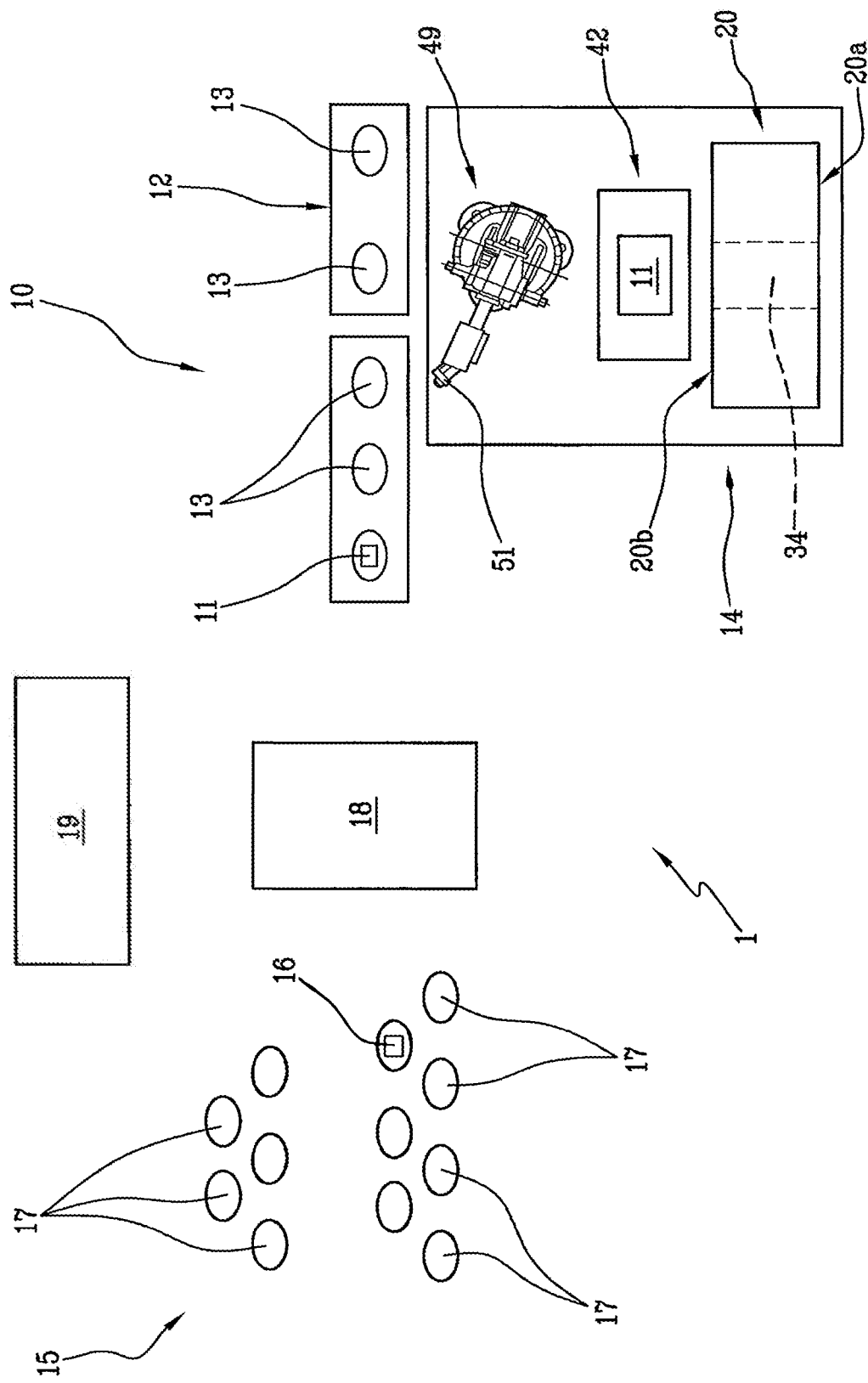
FIG. 1 schematically shows a top view of a plant for building tyres in accordance with the present invention.

The plant 1 further comprises a line 15 for building crown structures, in which a crown structure, comprising at least the belt structure 7 and preferably also the tread band 8, is formed on a forming drum 16. In FIG. 1, a plurality of work stations 17 are indicated that belong to the aforesaid line 15 for building crown structures and each dedicated to forming at least one portion of a component of the tyre 2 on the forming drum 16. The forming drum 16 is sequentially transferred from one station 17 to the subsequent station 17 by suitable devices, not illustrated. At least one work station 17 can be dedicated for obtaining the belt structure 7. By way of example, a work station 17 is preferably predisposed for obtaining the tread band 8 and/or the sidewalls 9. The plant 1 is also provided with an assembly and shaping station 18 operatively associated with the line 10 for building carcass structures and with the line 15 for building crown structures. In the assembly and shaping station 18, the carcass structure is toroidally shaped and associated with the crown structure, in a manner so as to obtain a green tyre. The green tyres built by the plant are sequentially transferred to a curing line 19, from which moulded and cured tyres 2 are obtained.

The station 14 dedicated for the integration of the annular anchoring structures 6 comprises a storage 20 that houses a plurality of baskets 21a, 21b, each of which capable of containing/supporting a plurality (preferably up to several dozen, e.g. about forty) of annular anchoring structures 6.

Figure 2:
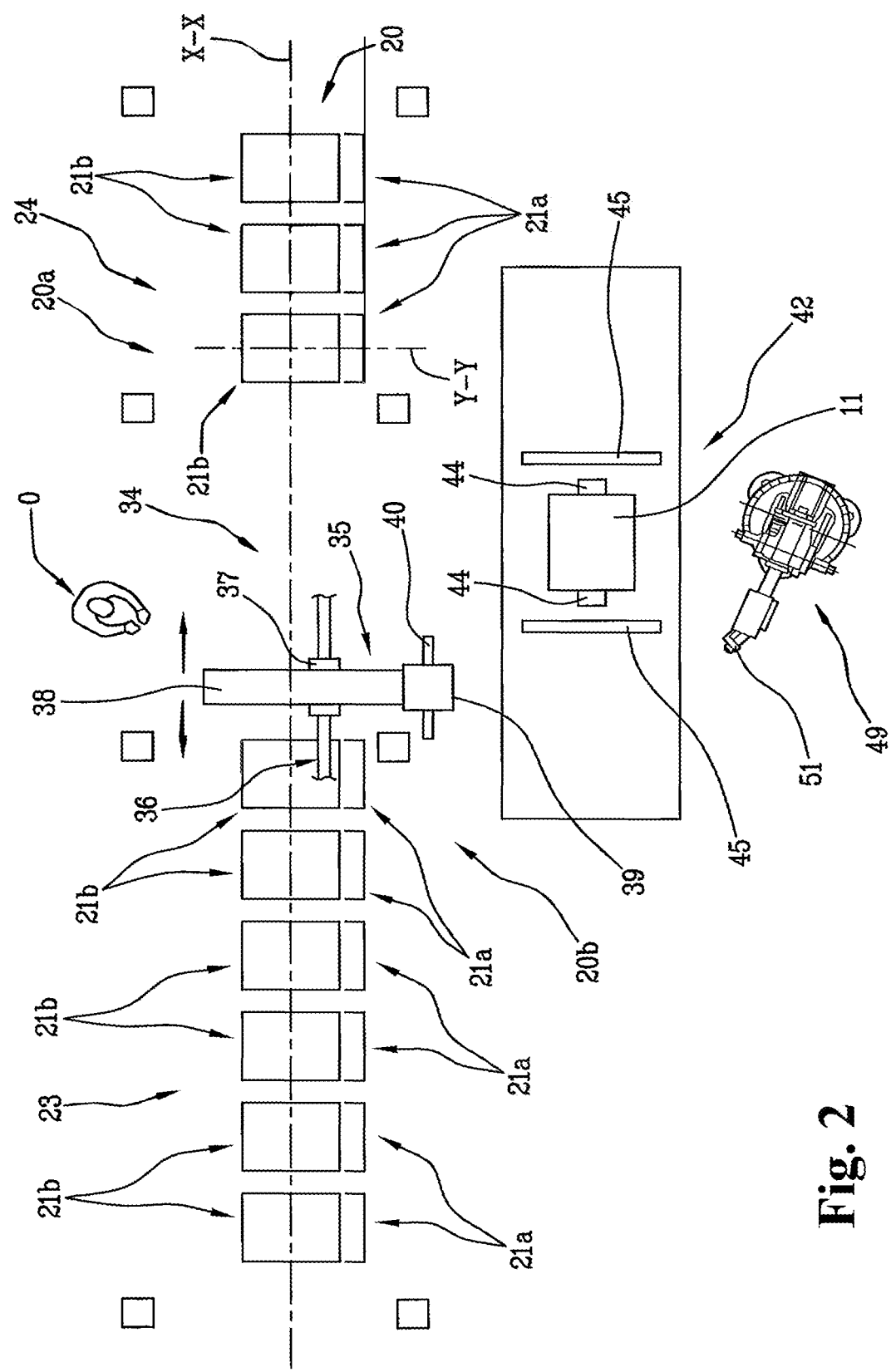
FIG. 2 shows a top view of a portion of the plant of FIG. 1 with some parts removed in order to better illustrate other parts.
Figure 3:
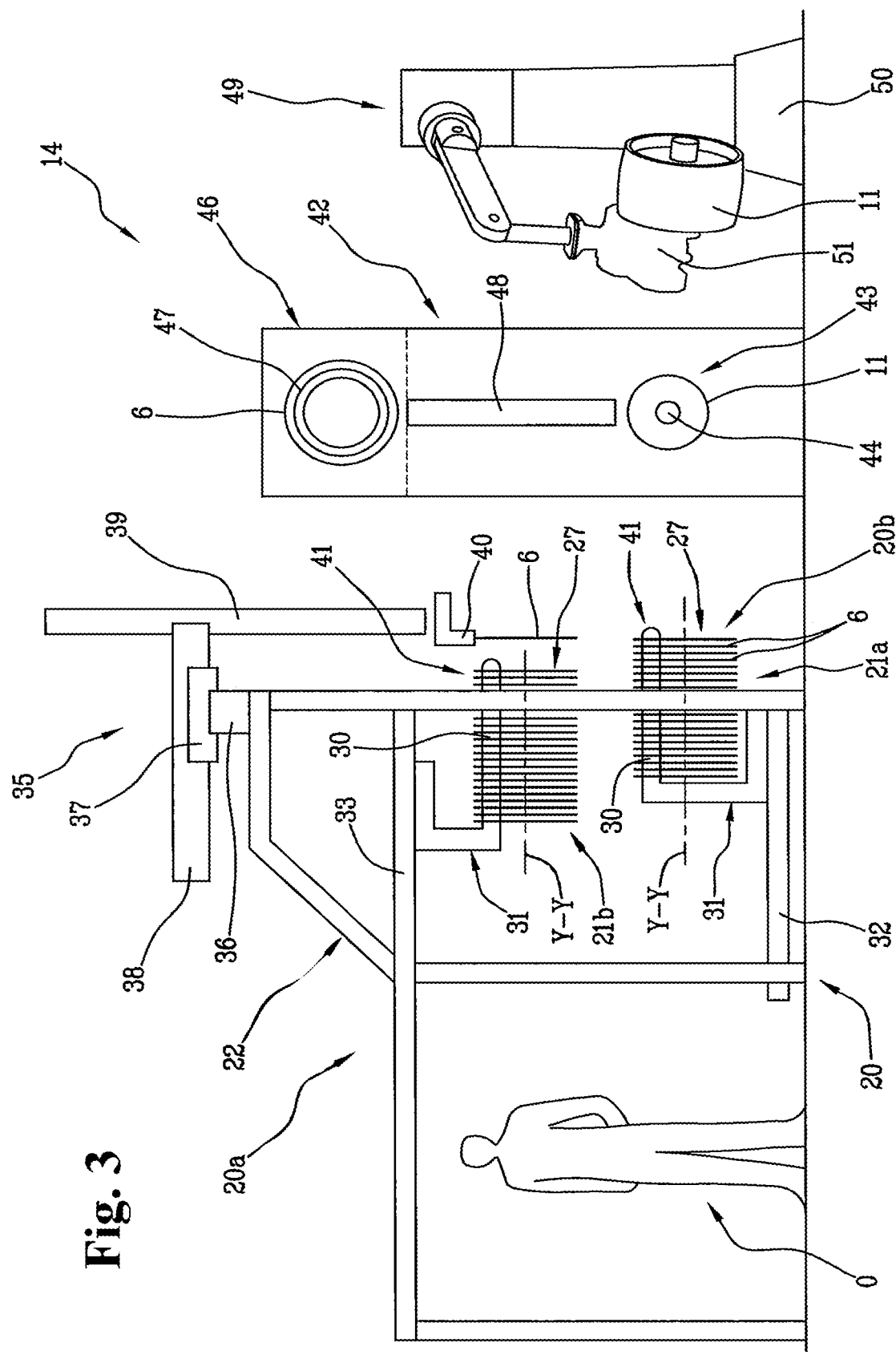
FIG. 3 shows a side elevation view of the portion of FIG. 2 with some parts removed in order to better illustrate other parts.
Figure 4:
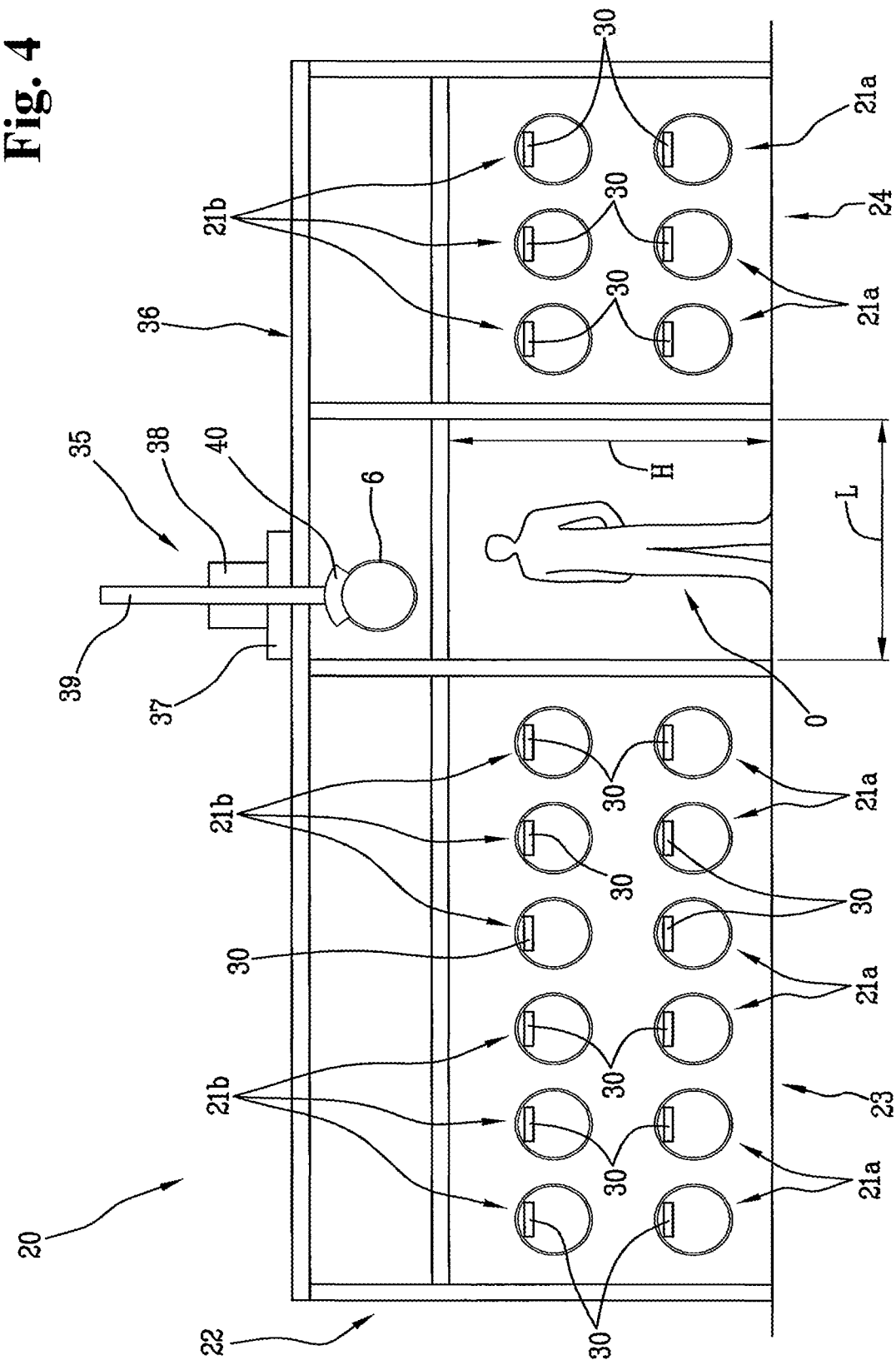
FIG. 4 shows a front elevation view of the portion of FIG. 2 with some parts removed in order to better illustrated other parts.

As is more visible in FIGS. 2, 3 and 4, the baskets 21a, 21b are arranged in a framework 22 and organised in two groups: a first group 23 formed by six adjacent pairs of baskets 21a, 21b, wherein each pair is composed of a lower basket 21a and an upper basket 21b; a second group 24 formed by three adjacent pairs of baskets 21a, 21b, wherein each pair is composed of a lower basket 21a and an upper basket 21b. In other words, each of the two groups 23, 24 is formed by two superimposed rows of baskets 21a, 21b. The storage 20 has a main extension direction "X-X" along which the baskets 21a, 21b of each row are consecutively arranged. The storage 20 has a first side 20a and a second side 20b placed on opposite sides of said main extension direction "X-X". At the first side 20a, a walking area is present in which an operator "O" can freely move.

Figure 5:
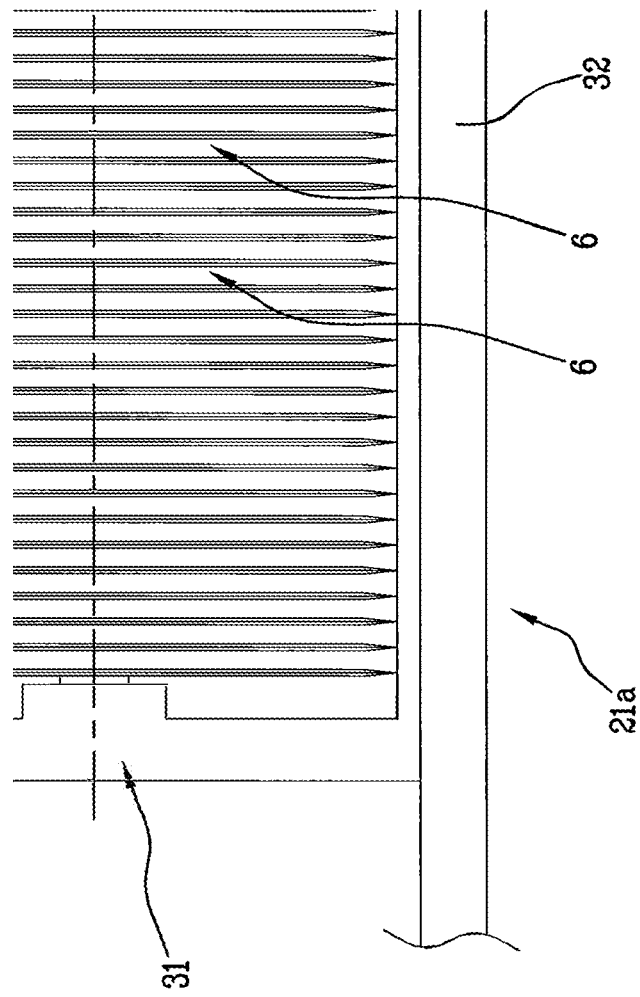
FIG. 5 shows an enlarged element of the plant of FIG. 1.

Each basket 21a, 21b comprises (FIG. 5) support elements adapted to support the annular anchoring structures 6 arranged next to each other at short distance and coaxial with a common main axis "Y-Y". A motor is capable of moving the support elements and the annular anchoring structures 6 carried by them along a direction parallel to the common main axis "Y-Y", in a manner so as to carry in succession each of the annular anchoring structures 6 at a final end 27 of the respective basket 21a, 21b.

The support elements are mounted next to each other on a belt (or a chain) wound on pulleys (not illustrated) moved by the motor. The belt and the pulleys are carried by an arm 30 parallel to the main axis "Y-Y".

The belt comprises an upper branch and a lower branch parallel to the common main axis "Y-Y" and extending for the entire length of the basket 21a, 21b. When the support elements are situated on the upper branch, they receive the annular anchoring structures 6 in seats 28 thereof. The belt, the pulleys and the motor constitute devices for moving the annular anchoring structures 6 along the common main axis "Y-Y". Each annular anchoring structure 6 rests in the respective seat at a radially internal portion thereof and is therefore hung at the support element. Each support element has abutment elements which, together with the seats, maintain the annular anchoring structures 6 at a predefined distance from each other along a common main axis "Y-Y".

The arm 30 and the motor are mounted on a load-bearing structure 31 in turn mounted, with the possibility of sliding, on the framework 22.

According to that illustrated, the load-bearing structure 31 associated with each of the lower baskets 21a (like that of FIG. 5) is extended below the basket itself 21a and is rested and slidably coupled to a base 32 integral with a lower portion of the framework 22 and parallel to the main axis "Y-Y". The load-bearing structure 31 associated with each of the upper baskets 21b (FIG. 3) is extended above the basket itself 21a and is slidably coupled to an overhead guide 33 of an upper portion framework 22 and parallel to the main axis "Y-Y". The baskets 21a, 21b of each group are adjacent to each other with the main axes "Y-Y" thereof parallel.

Each of the baskets 21a, 21b can be moved, by making it slide with respect to the framework 22 (on the base 32 or on the overhead guide 33), between a loading position and a work position.

In the loading position, the basket 21a, 21b is extracted on the first side 20a of the storage 20 at the walking area. The overhead guide 33 is extended up to the walking area and each upper basket 21b in the loading position can be brought until it is above such area. The base 22 is not extended on the walking area but each lower basket 21a can be projectingly extracted until it is over said area.

In this position, the operator "O" picks up the annular anchoring structures from a container (not illustrated), where said annular anchoring structures are horizontally stacked on each other and divided by a separator; the operator loads such structures one at a time in the respective seats of the baskets 21a, 21b. Each basket 21a, 21b can be completely or partially loaded. The walking zone therefore constitutes an area for loading the baskets 21a, 21b.

In the work position, the basket 21a, 21b faces the second side 20b of the storage 20 and projects slightly beyond the framework 22. As is more visible in FIG. 3, in the work position, the final end 27 of the lower baskets 21a projects more than the final end 27 of the upper baskets 21b. Between the first group 23 and the second group 24 of baskets 21a, 21b, a through free space pass or opening 34 (FIGS. 2 and 4) is delimited, which is opened both on the first side 20a and on the second side 20b and places such sides in communication. According to that illustrated in FIG. 4, the opening 34 is further delimited by two of the columns of the framework 22. Such opening 34 has a passage section such to allow the movement and/or stopping of the operator "O" possibly provided with work tools. For example, the opening 34 has a rectangular passage section with a width "L" comprised between about 1500 mm and about 2500 mm, preferably equal to about 2000 mm, and a height "H" comprised between about 2200 mm and about 2500 mm, preferably equal to about 2200 mm. The opening 34 preferably allows the operator who is in the loading area to see from one side to the other through the storage 20.

The station 14 dedicated for the integration of the annular anchoring structures 6 comprises a handling device 35 mounted and moveable on a guide 36 installed on the framework 22. The guide 36 is extended parallel to the main extension direction "X-X" and is positioned above the framework 22 preferably towards the second side 20b thereof (FIGS. 2, 3 and 4). The handling device 35 and the storage 20 form an apparatus for controlling the management of the annular anchoring structures during the building of the tyre 2.

The handling device 35 comprises a carriage 37 slidably mounted on the guide 36 and moveable in translation along the same by means of a motor, not illustrated. On the carriage 37, a first arm 38 is installed which can slide with respect to said carriage 37 by means of a motor, not illustrated, along a direction orthogonal to the guide 36 and parallel to the ground. At one end of the first arm 38 that projects from the second side 20b of the storage 20, a second arm 39 is positioned that can slide with respect to said first arm 38, by means of a motor, not illustrated, along a vertical direction orthogonal to the guide 36 and to the first arm 38. On a lower end of the second arm 39, a gripper 40 is mounted which can rotate, preferably by means of a motor, not illustrated, around the abovementioned vertical direction. The gripper 40 is moveable along three axes "X,Y,Z" and rotatable around the vertical axis "Z". The gripper 40 is moveable in front of the second side 20b of the storage 20 and can come to grasp and pick up each of the annular anchoring structures 6 placed at the final end 27 of each of the baskets 21a, 21b situated in the work position. In particular, the gripper 40, in order to grasp the annular anchoring structure 6, comes to be positioned in a predefined single area 41 for picking up a respective basket 21a, 21b arranged at an upper portion of the final end 27 of said basket 21a, 21b. Since the annular anchoring structure 6 is hung, such predefined single picking up area 41 does not vary upon the variation of the type/size of the annular anchoring structure 6.

The guide 36 passes above the opening 34 and the handling device 35 is capable of moving the gripper 40 from the first group 23 to the second group 24 of baskets 21a, 21b, making it move above the opening 34 without interferences with the volume defined by the opening itself.

The handling device 35 is sized to carry a maximum load of about 12 Kg, i.e. the weight of the gripper 40 and of an annular anchoring structure 6 which is usually comprised between about 0.2 Kg and about 0.7 Kg.

The station 14 dedicated for the integration of the annular anchoring structures 6 comprises a tyre bead-forming machine 42 which is positioned in front of the second side 20b of the storage 20 and at the opening 34 which is therefore faced on the machine itself 42.

The tyre bead-forming machine 42 has a lower area 43 or work area, arranged at a base of the machine, which comprises devices 44 for supporting a building drum 11 provided with a carcass sleeve and bead formation devices 45, illustrated only schematically since per se known; such devices 44 are adapted to retain, at axially opposite sides of the building drum 11, a pair of annular anchoring structures 6, to fit each of said annular anchoring structures 6 on the opposite terminal zones of said carcass sleeve and to subsequently turn up the zones around the annular anchoring structures 6 to form the beads 5. Such lower work area is open towards the opening 34 or in any case allows an operator situated in the opening 34 or in front of the opening 34 to see the carcass sleeve 11 being processed inside the tyre bead-forming machine 42 and to access, by moving through the opening 34, the carcass sleeve 11 positioned in such lower area 43 if necessary.

The tyre bead-forming machine 42 has an upper area 46, placed above the lower area 43 at a height about equal to or greater than the height "H" of the opening 34. The upper area 46 houses receiving devices 47, illustrated only schematically, for receiving the annular anchoring structures 6 which are conveyed by the handling device 35. The receiving devices 47 are capable of retaining and supporting one pair of annular anchoring structures 6 at a time, which are delivered thereto by the handling device 35. The handling device 35 is operatively active between the second side 20b and the tyre bead-forming machine 42 and is moveable between a position for picking up the annular anchoring structures 6 from the storage 20 and a position for releasing the annular anchoring structures 6 to the receiving devices 47 of the tyre bead-forming machine 20.

The tyre bead-forming machine 42 further comprises conveying devices 48, illustrated only schematically, which provide for moving the pair of annular anchoring structures 6 retained by the receiving devices 47 up to the lower area 43 of the tyre bead-forming machine 42 and releasing them to the bead formation devices 45.

The station 14 dedicated for the integration of the annular anchoring structures 6 comprises a conveyor device 49 which in the represented embodiment is defined by an anthropomorphic robot arm, per se known, having a base 50 rested adjacent to the tyre bead-forming machine 42 on the opposite side with respect to the storage 20 (FIGS. 2 and 3). The anthropomorphic arm 49 comprises a gripping end 51 which is capable of grasping, conveying and releasing a building drum 11. The anthropomorphic arm 49 is operatively positioned between the tyre bead-forming machine 42 and the building stations 13 arranged upstream and downstream of said machine 42 (FIG. 1). More particularly, the anthropomorphic arm 49 is capable of conveying the building drums 11 between the building station 13 upstream and the tyre bead-forming machine 42 and between the tyre bead-forming machine 42 and the building station 13 downstream. The anthropomorphic arm 49 is sized to carry a maximum load of about 350 Kg, i.e. the weight of a building drum 11 which is usually comprised between about 180 Kg and about 220 Kg.

During use and in accordance with the method according to the present invention, the operator "O" positioned in the loading area carries out the manual loading of the annular anchoring structures 6 in the baskets 21a, 21b of the storage 20 while the baskets 21a, 21b are situated in the respective extracted position on the first side 20a of the storage 20 itself. Once partly or completely filled, each basket 21a, 21b is manually reinserted in the work position.

On the basis of control logics that among other things account for the type of tyre 2 to be built and the availability of the annular anchoring structures 6 in the baskets 21a, 21b, the handling device 35 picks up pairs of annular anchoring structures 6 and delivers them to the receiving devices 47.

The conveying devices 48 provide for moving the pair of annular anchoring structures 6 retained by the receiving devices 47 up to the lower area 43 of the tyre bead-forming machine 42 and releasing them to the bead formation devices 45.

The conveyor device 49 picks up a building drum 11 provided with a carcass sleeve from the processing station 13 situated upstream of the tyre bead-forming machine 42 and delivers it to the devices 44 for supporting the building drum 11 of the machine itself 42.

Here the machine 42 provides for forming the beads 5, in a per se known manner.

During the formation of the beads 5, the handling device 35 is already brought back to the second side 20b of the storage 20 in order to pick up the annular anchoring structures 6 intended for the subsequent tyre 2.

The handling device 35, during each movement thereof, does not move in front of the opening 34 but passes above or adjacent thereto. In this manner, the operator "O" is capable of visually inspecting the work area 43 and/or accessing the work area 43 itself during the entire work cycle of the machine 42 or, more generally, of the station 14 dedicated for the integration of the annular anchoring structures 6, i.e., during the picking up of the two annular anchoring structures 6 from the storage 20, the loading of the two annular anchoring structures 6 on the tyre bead-forming machine 42, the positioning of the building drum 11 in the tyre bead-forming machine 42, the extracting of the building drum 11 provided with the beads 5 from the tyre bead-forming machine 42.

The invention claimed is:

1. A plant for building a tyre for vehicle wheels, comprising:
 a line for building a carcass structure with a carcass sleeve on a building drum comprising a plurality of building stations; and
 a line for building a crown structure on a forming drum comprising a plurality of work stations,
 wherein one of the building stations is a station for integration of annular anchoring structures in the carcass sleeve and comprises:
  a storage framework having a main horizontal extension direction and comprising a plurality of storage baskets organized in a first group of storage baskets and in a second group of storage baskets, wherein each storage basket is configured to house a plurality of annular anchoring structures arranged next to each other at a short distance and coaxial with a common horizontal main axis perpendicular to the main horizontal extension direction of the storage framework, the storage framework having a first free side and a second free side placed on opposite sides of the main horizontal extension direction, wherein the first free side comprises a walking area in which an operator can freely move; and a tyre bead-forming machine arranged adjacent to the second free side of the storage framework, wherein the tyre bead-forming machine includes an upper area for retaining and supporting one pair of annular anchoring structures at a time and a lower area, wherein each storage basket is mounted on a respective load bearing structure slidably coupled with a respective load bearing guide integral with the storage framework, wherein the load bearing guide is parallel to the common horizontal main axis, wherein each load bearing structure and its respective load bearing guide are configured so that the respective storage basket slidably moves parallel to the common horizontal main axis, from a loading position at the walking area of the first free side in which each storage basket is configured to be extracted from its respective first group of storage baskets or second group of storage baskets, to a work position in which each storage basket faces the second free side of the storage framework, and projects beyond the storage framework, to the loading position and wherein the storage framework has at least one opening between the first group of storage baskets and the second group of storage baskets, wherein the opening is opened both on the first free side and on the second free side placing such sides in communication, faces the tyre bead-forming machine, and is adapted for visual inspection of the tyre bead-forming machine and for access to the tyre bead-forming machine through the storage framework from the first free side by an operator passageway that is suitable for passage of an operator in an upright freestanding position.

2. The plant as claimed in claim 1, wherein the station for integration of annular anchoring structures comprises a handling device arranged between the second free side and the tyre bead-forming machine, wherein the handling device comprises a gripper that is moveable between a position for picking up the annular anchoring structures from the storage framework and a position for releasing the annular anchoring structures to the tyre bead-forming machine.

3. The plant as claimed in claim 2, wherein the handling device is sized to carry a maximum load of 12 Kg.

4. The plant as claimed in claim 2, wherein in a release position, the handling device is configured to transfer the annular anchoring structures to the upper area.

5. The plant as claimed in claim 2, wherein the storage framework further comprises a guide that is disposed above the plurality of storage baskets and that is extended parallel to the main horizontal extension direction of the storage framework, wherein the handling device is configured to move along the guide.

6. The plant as claimed in claim 5, wherein the guide is disposed above the at least one opening and in a manner that does not limit the visual inspection of the tyre bead-forming machine and the access to the tyre bead-forming machine during the moving of the handling device.

7. The plant as claimed in claim 2, wherein the handling device is movable between the first group of storage baskets and the second group of storage baskets along a path that does not interfere with the at least one opening adapted for visual inspection.

8. The plant as claimed in claim 2, wherein the first group of storage baskets and the second group of storage baskets are spaced horizontally along the main horizontal extension direction and the handling device is movable above the at least one opening adapted for visual inspection.

9. The plant as claimed in claim 1, wherein the station for integration of annular anchoring structures comprises a conveyor operatively active between the tyre bead-forming machine, a building station downstream of the tyre bead-forming machine and a building station upstream of the tyre bead-forming machine, for conveying the building drum between the building station upstream and the tyre bead-forming machine and between the tyre bead-forming machine and the building station downstream.

10. The plant as claimed in claim 9, wherein the conveyor is arranged adjacent to the tyre bead-forming machine and on an opposite side with respect to the storage framework.

11. The plant as claimed in claim 9, wherein the conveyor is an anthropomorphic arm having a base rested adjacent to the tyre bead-forming machine and on the opposite side with respect to the storage framework.

12. The plant as claimed in claim 9, wherein the conveyor is sized to carry a maximum load of 350 Kg.

13. The plant as claimed in claim 9, wherein the tyre bead-forming machine comprises:

a second conveyor for conveying the annular anchoring structures from the upper area to the lower area.

14. The plant as claimed in claim 13, wherein the upper area is arranged at a height equivalent to or greater than a height of the at least one opening adapted for visual inspection.

15. The plant as claimed in claim 1, wherein the storage framework is a floor supported storage framework structure.

16. The plant as claimed in claim 1, wherein each storage basket comprises a plurality of seats, wherein each seat is configured to house one of the annular anchoring structures.

17. The plant as claimed in claim 1, wherein each of the first group of storage baskets and the second group of storage baskets comprises at least one pair of storage baskets formed by a lower storage basket and an upper storage basket, wherein the lower storage basket and the upper storage basket are configured to slide separately with respect to the storage framework.

18. The plant as claimed in claim 17, wherein each of the lower storage basket and the upper storage basket is mounted on a respective load bearing structure slidably coupled with a respective load bearing guide integral with the storage framework, wherein the load bearing guide is parallel to the common horizontal main axis, wherein each load bearing structure and its respective load bearing guide are configured so that the respective lower storage basket or upper storage basket slidably moves parallel to the common horizontal main axis, from a loading position at the walking area of the first free side in which each lower storage basket or upper storage basket is configured to be extracted from its respective first group or second group, to a work position in which each lower storage basket or upper storage basket faces the second side of the storage framework and projects beyond the storage framework, to the loading position.

19. The plant as claimed in claim 17, wherein the lower storage basket projects on the second free side with respect to the upper storage basket.

20. The plant as claimed in claim 17, wherein the lower storage basket is rested on a lower portion of the storage framework.

21. The plant as claimed in claim 17, wherein the upper storage basket is hung at an upper portion of the storage framework.

22. An apparatus for controlling the management of annular anchoring structures in a process and a plant for building a tyre for vehicle wheels, comprising:
a storage framework having a main horizontal extension direction and comprising a plurality of storage baskets organized in a first group of storage baskets and in a second group of storage baskets, wherein each storage basket is configured to house a plurality of annular anchoring structures arranged next to each other at a short distance and coaxial with a common horizontal main axis perpendicular to the main horizontal extension direction of the storage framework,
the storage framework having a first free side and a second free side placed on opposite sides of said main horizontal extension direction, wherein the first free side comprises a walking area in which an operator can freely move; and
a tyre bead-forming machine arranged adjacent to the second free side of the storage framework,
wherein the tyre bead-forming machine includes an upper area for retaining and supporting one pair of annular anchoring structures at a time and a lower area;
wherein each storage basket is mounted on a respective load bearing structure slidably coupled with a respective load bearing guide integral with the storage framework, wherein the load bearing guide is parallel to the common horizontal main axis,
wherein each load bearing structure and its respective load bearing guide are configured so that the respective storage basket slidably moves parallel to the common horizontal main axis, from a loading position at the walking area of the first free side in which each storage basket is configured to be extracted from its respective first group of storage baskets or second group of storage baskets, to a work position in which each storage basket faces the second free side of the storage framework and projects beyond the storage framework, to the loading position and
a handling device arranged between the second free side and the tyre bead-forming machine, the handling device comprises a gripper that is moveable between a position for picking up the annular anchoring structures from the storage framework and a position for releasing the annular anchoring structures in the tyre bead-forming machine,
wherein the storage framework has at least one opening between the first group of storage baskets and the second group of storage baskets, wherein the opening is opened both on the first free side and on the second free side placing such sides in communication, faces the tyre bead-forming machine, and is adapted for visual inspection of the tyre bead-forming machine and for access to the tyre bead-forming machine through the storage framework from the first free side by an operator passageway that is suitable for passage of an operator in an upright freestanding position.

23. The apparatus as claimed in claim 22, wherein each storage basket comprises a plurality of seats, wherein each seat is capable of housing an annular anchoring structure.

24. The apparatus as claimed in claim 23, wherein each storage basket has a single area for picking up annular anchoring structures thereof.

25. The apparatus as claimed in claim 24, wherein the single area for picking up is arranged at a final end of a respective storage basket.

26. The apparatus as claimed in claim 25, wherein the single area for picking up is arranged at an upper portion of the final end.

27. The apparatus as claimed in claim 25, wherein the final end of each storage basket is faced on the second free side of the storage framework.

28. The apparatus as claimed in claim 24, wherein the single area for picking up is unvarying upon variation of characteristics of the annular anchoring structures.

29. The apparatus as claimed in claim 24, wherein each storage basket comprises devices for moving the annular anchoring structures toward the single area for picking up.

30. The apparatus as claimed in claim 22, wherein the handling device is moveable between the first group of storage baskets and the second group of storage baskets along a path not interfering with the at least one opening adapted for visual inspection.

31. The apparatus as claimed in claim 22, wherein the first group of storage baskets and the second group of storage baskets are spaced horizontally and the handling device is moveable above the at least one opening adapted for visual inspection.

32. The apparatus as claimed in claim 22, wherein the at least one opening adapted for visual inspection has a width between about 1500 mm and about 2500 mm.

33. The apparatus as claimed in claim 22, wherein the at least one opening adapted for visual inspection has a height between about 2200 mm and about 2500 mm.

34. The apparatus as claimed in claim 33, wherein each storage basket is extractable on the first free side in a position for loading the annular anchoring structures.

35. The apparatus as claimed in claim 33, wherein each of the first group of storage baskets and the second group of storage baskets comprises at least one pair of storage baskets formed by a lower storage basket and an upper storage basket.

36. The apparatus as claimed in claim 35, wherein the lower storage basket projects on the second free side with respect to the upper storage basket.

37. The apparatus as claimed in claim 35, wherein the lower storage basket is rested on a lower portion of a framework of said apparatus.

38. The apparatus as claimed in claim 35, wherein the upper storage basket is hung at an upper portion of the storage framework of the apparatus.

39. The apparatus as claimed in claim 22, wherein the storage framework comprises a guide disposed above the storage baskets, the handling device being moveable on the guide.

40. The apparatus as claimed in claim 39, wherein the guide is disposed above the at least one opening adapted for visual inspection.

41. The apparatus as claimed in claim 22, wherein the gripper can be moved along three axes.

42. The apparatus as claimed in claim 22, wherein the handling device is sized to carry a maximum load of about 12 Kg.

43. A method for verifying correct formation of beads in a plant for building a tyre for vehicle wheels, comprising:
loading a plurality of annular anchoring structures in a storage framework, the storage framework having a main horizontal extension direction and comprising a plurality of storage baskets organized in a first group of storage baskets and in a second group of storage baskets, wherein each storage basket is configured to house the plurality of annular anchoring structures arranged next to each other at a short distance and coaxial with a common horizontal main axis perpendicular to the main horizontal extension direction of the storage framework, the storage framework having a first free side and a second free side on opposite sides of the main horizontal extension direction, wherein the first free side comprises a walking area in which an operator can freely move;

wherein each storage basket is mounted on a respective load bearing structure slidably coupled with a respective load bearing guide integral with the storage framework, wherein the load bearing guide is parallel to the common horizontal main axis, wherein each load bearing structure and its respective load bearing guide are configured so that the respective storage basket slidably moves parallel to the common horizontal main axis, from a loading position at the walking area of the first free side in which each storage basket is configured to be extracted from its respective first group of storage baskets or second group of storage baskets, to a work position in which each storage basket faces the second free side of the storage framework and projects beyond the storage framework, to the loading position and wherein the storage framework has at least one opening between the first group of storage baskets and the second group of storage baskets, wherein the opening is opened both on the first free side and on the second free side placing such sides in communication, disposing the plurality of annular anchoring structures in at least the first group of storage baskets and the second group of storage baskets separated by the at least one opening;

positioning a building drum provided with a carcass structure with a carcass sleeve in a tyre bead-forming machine arranged adjacent to the second free side of the storage framework, wherein the tyre bead-forming machine includes an upper area for retaining and supporting one pair of the plurality of annular anchoring structures at a time and a lower area;

picking up two of the plurality of annular anchoring structures from the storage framework and loading the two annular anchoring structures on the tyre bead-forming machine; and in a work area of the tyre bead-forming machine, fitting on each of two axially opposite zones of the carcass sleeve a respective annular anchoring structure and turning up each of said zones around a respective annular anchoring structure to form the beads, wherein the at least one opening faces the tyre bead-forming machine and is adapted for visual inspection of the tyre bead-forming machine and is adapted for access to the tyre bead-forming machine through the storage framework from the first free side by an operator passageway that is suitable for passage of an operator in an upright freestanding position.

44. The method as claimed in claim 43, wherein the visual inspection of the tyre bead-forming machine and/or access to the tyre bead-forming machine is during the formation of the beads.

45. The method as claimed in claim 43, wherein the visual inspection of the tyre bead-forming machine and/or access to the tyre bead-forming machine is during the picking up of the two annular anchoring structures from the storage framework.

46. The method as claimed in claim 43, wherein the visual inspection of the tyre bead-forming machine and/or access to the tyre bead-forming machine is when loading the two annular anchoring structures on the tyre bead-forming machine.

47. The method as claimed in claim 43, wherein the visual inspection of the tyre bead-forming machine and/or access to the tyre bead-forming machine is during the positioning of the building drum in the tyre bead-forming machine.

48. The method as claimed in claim 43, wherein the visual inspection of the tyre bead-forming machine and/or access to the tyre bead-forming machine is when extracting the building drum with the carcass sleeve provided with the beads formed by the tyre bead-forming machine.

\* \* \* \* \*